US012391042B2

(12) United States Patent
Fujimura et al.

(10) Patent No.: US 12,391,042 B2
(45) Date of Patent: Aug. 19, 2025

(54) LIQUID DISCHARGE HEAD, LIQUID DISCHARGE UNIT, AND LIQUID DISCHARGE APPARATUS

(71) Applicants: Yuki Fujimura, Kanagawa (JP); Toshiaki Masuda, Kanagawa (JP)

(72) Inventors: Yuki Fujimura, Kanagawa (JP); Toshiaki Masuda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 188 days.

(21) Appl. No.: 18/234,880

(22) Filed: Aug. 17, 2023

(65) Prior Publication Data

US 2024/0109317 A1 Apr. 4, 2024

(30) Foreign Application Priority Data

Sep. 29, 2022 (JP) ................................ 2022-156593
Jun. 26, 2023 (JP) ................................ 2023-103945

(51) Int. Cl.
*B41J 2/14* (2006.01)

(52) U.S. Cl.
CPC ................................ *B41J 2/14233* (2013.01)

(58) Field of Classification Search
CPC .......... B41J 2/14233; B41J 2002/14241; B41J 2002/14362; B41J 2002/14459; B41J 2002/14491; B41J 2202/20
See application file for complete search history.

(56) References Cited

U.S. PATENT DOCUMENTS

2014/0267509 A1 9/2014 Shinkai et al.
2015/0022592 A1 1/2015 Aoyama et al.
2015/0070444 A1 3/2015 Ishimori et al.
2015/0171307 A1 6/2015 Masuda et al.
2016/0001556 A1 1/2016 Masuda et al.
2017/0100934 A1 4/2017 Masuda et al.
2017/0253040 A1 9/2017 Shinkai et al.
2018/0370237 A1 12/2018 Mizukami et al.
2019/0044055 A1 2/2019 Kondo et al.
(Continued)

FOREIGN PATENT DOCUMENTS

JP 2016-130002 A 7/2016
JP 2019-150991 A 9/2019
JP 7010062 B2 * 1/2022 .............. H04J 14/02

OTHER PUBLICATIONS

Onishi Koji, "Liquid Discharge Head, Liquid Discharge Unit and Device for Discharging Liquid" (JP 7010062 B2), Jan. 26, 2022, [Description: First Embodiment] (Year: 2022).*
(Continued)

*Primary Examiner* — Lisa Solomon
(74) *Attorney, Agent, or Firm* — XSENSUS LLP

(57) ABSTRACT

A liquid discharge head includes: a first substrate having a joint region; a sheet member having a first face joined to the first substrate with a joining agent applied to the joint region of the first substrate; and a second substrate joined to a second face opposite to the first face of the sheet member and the first substrate, the sheet member interposed between the first substrate and the second substrate, wherein the second substrate has a gap facing the second face of the sheet member opposite to a portion of the first face of the sheet member joined to the joint region of the first substrate across the sheet member.

12 Claims, 14 Drawing Sheets

(56) References Cited

U.S. PATENT DOCUMENTS

| | | | |
|---|---|---|---|
| 2019/0270310 | A1 | 9/2019 | Masuda et al. |
| 2020/0298570 | A1 | 9/2020 | Masuda et al. |
| 2021/0039393 | A1 | 2/2021 | Mizukami et al. |
| 2021/0162759 | A1 | 6/2021 | Miwa et al. |
| 2021/0252862 | A1 | 8/2021 | Masuda |
| 2022/0097373 | A1 | 3/2022 | Masuda |
| 2022/0242123 | A1 | 8/2022 | Hirabayashi et al. |
| 2023/0021821 | A1 | 1/2023 | Kuroda et al. |
| 2023/0108462 | A1 | 4/2023 | Masuda et al. |
| 2023/0141751 | A1 | 5/2023 | Sugioka et al. |
| 2023/0146297 | A1 | 5/2023 | Masuda |
| 2023/0147417 | A1 | 5/2023 | Fujimura et al. |

OTHER PUBLICATIONS

U.S. Appl. No. 18/132,451, filed Apr. 10, 2023.
U.S. Appl. No. 18/197,738, filed May 16, 2023.
U.S. Appl. No. 18/271,848, filed Jul. 12, 2023.

* cited by examiner

COMPARATIVE EXAMPLE

LIQUID DISCHARGE HEAD, LIQUID DISCHARGE UNIT, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2022-156593, filed on Sep. 29, 2022, and Japanese Patent Application No. 2023-103945, filed on Jun. 26, 2023, in the Japan Patent Office, the entire disclosure of which is hereby incorporated by reference herein.

BACKGROUND

Technical Field

The present embodiment relates to a liquid discharge head, a liquid discharge unit, and a liquid discharge apparatus.

Related Art

A liquid discharge head includes a plurality of substrates stacked and jointed in the thickness direction of the plurality of substrates.

For example, a liquid discharge head includes a nozzle plate, a channel substrate, a common chamber member, a damper member, and a damper chamber formation member stacked and jointed one on another in the thickness direction of substrates. The channel substrate is provided with an individual chamber in communication with a nozzle of the nozzle plate and an electromechanical transducer that generates pressure to the liquid in the individual chamber. The damper member (sheet member) is interposed between the damper chamber formation member (first substrate) and the common chamber member (second substrate).

In a liquid discharge head, in some cases, the damper member is joined to the damper chamber formation member before the damper chamber formation member is jointed to the common chamber member. In this case, a joining agent for use in joining is likely to cause trouble in the liquid discharge head.

SUMMARY

A liquid discharge head includes: a first substrate having a joint region; a sheet member having a first face joined to the first substrate with a joining agent applied to the joint region of the first substrate; and a second substrate joined to a second face opposite to the first face of the sheet member and the first substrate, the sheet member interposed between the first substrate and the second substrate, wherein the second substrate has a gap facing the second face of the sheet member opposite to a portion of the first face of the sheet member joined to the joint region of the first substrate across the sheet member.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 11 is a cross-sectional view of a joint between a damper member and a common channel member in the liquid discharge head in the embodiment, taken along line A-A' of

FIG. 9;

Figure 1:
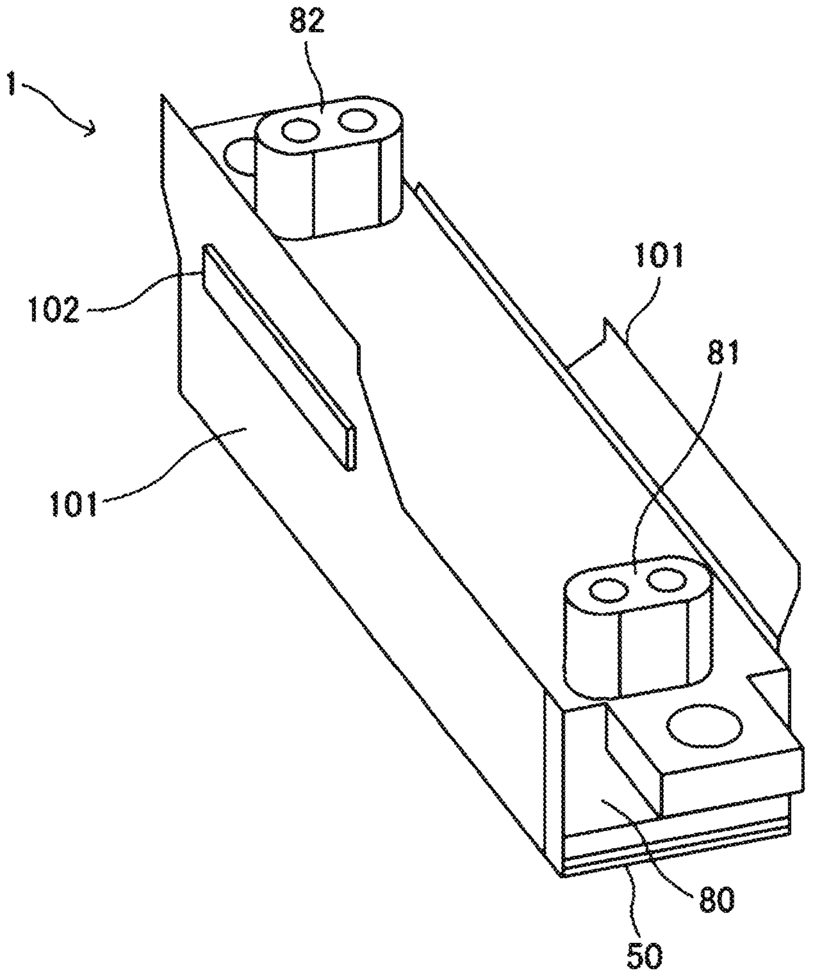
FIG. 1 is an external perspective explanatory view of a liquid discharge head in an embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A liquid discharge head according to an embodiment of the present embodiment, for use in a liquid discharge apparatus, will be described below.

FIG. 1 is an external perspective explanatory view of the liquid discharge head in the present embodiment.

Figure 2:
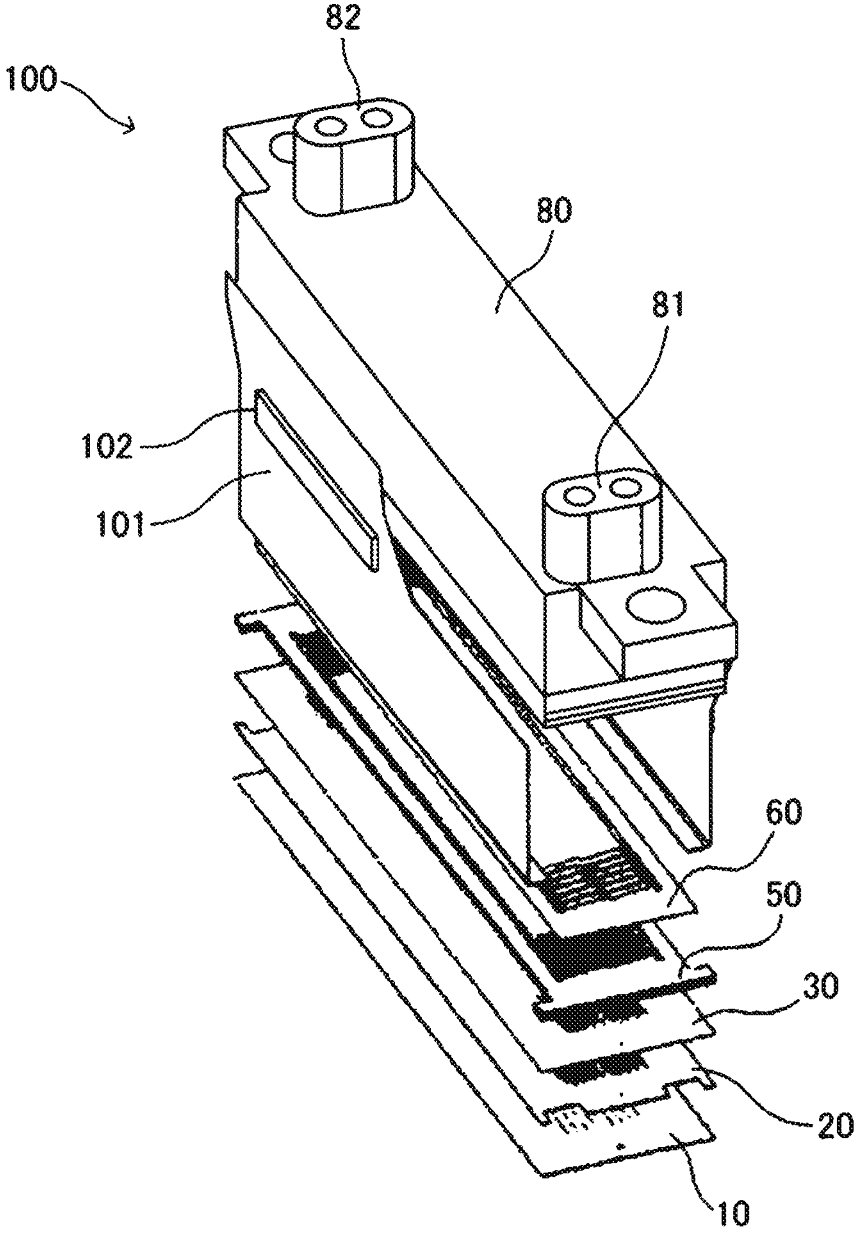
FIG. 2 is an exploded perspective explanatory view of the liquid discharge head.

FIG. 2 is an exploded perspective explanatory view of the liquid discharge head.

Figure 3:
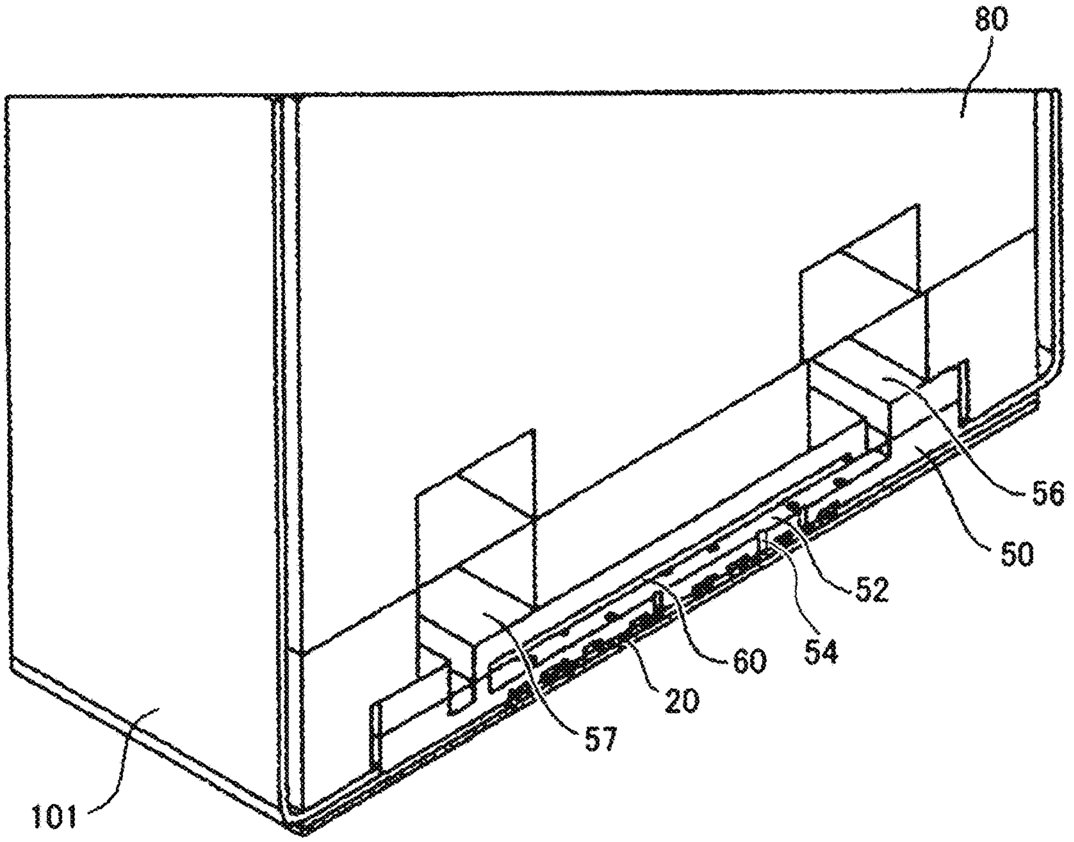
FIG. 3 is a cross-sectional perspective explanatory view of the liquid discharge head.

FIG. 3 is a cross-sectional perspective explanatory view of the liquid discharge head.

Figure 4:
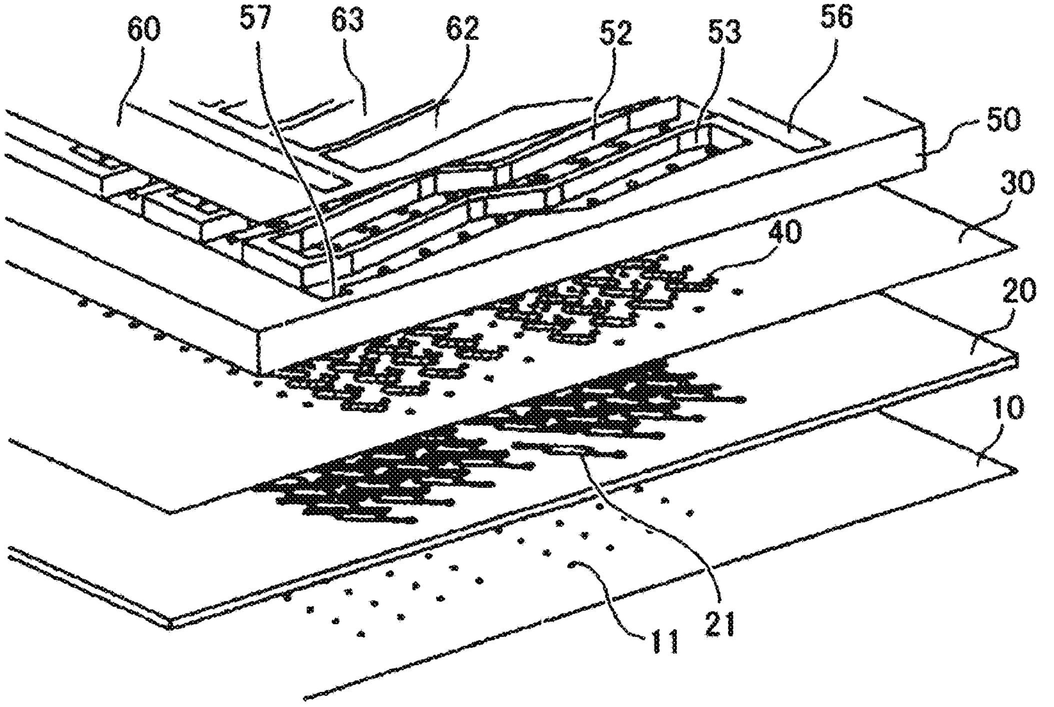
FIG. 4 is an exploded perspective explanatory view of the liquid discharge head from which a frame member is removed.

FIG. 4 is an exploded perspective explanatory view of the liquid discharge head from which a frame member is removed.

Figure 5:
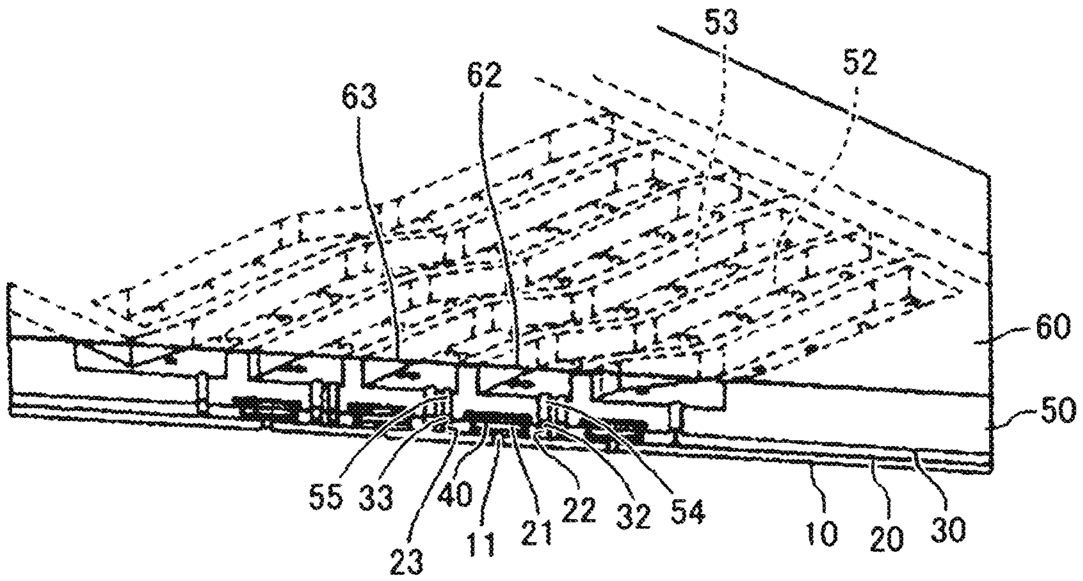
FIG. 5 is a cross-sectional perspective explanatory view of a channel portion of the liquid discharge head.

FIG. 5 is a cross-sectional perspective explanatory view of a channel portion of the liquid discharge head.

Figure 6:
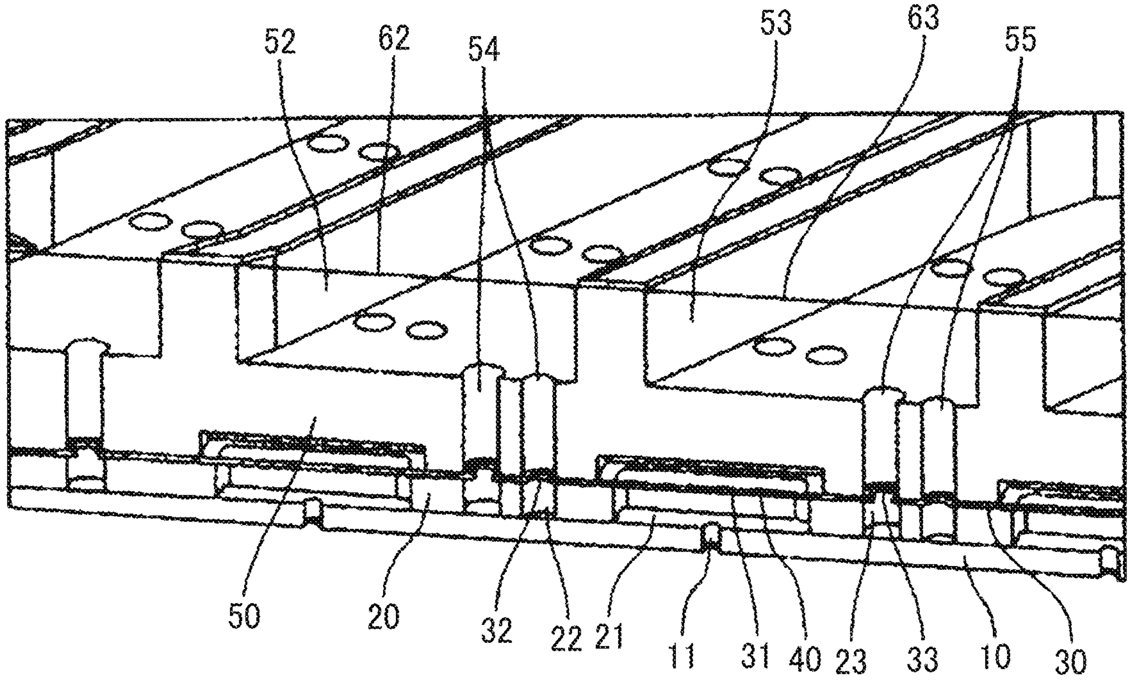
FIG. 6 is an enlarged cross-sectional perspective explanatory view of the channel portion of the liquid discharge head.

FIG. 6 is an enlarged cross-sectional perspective explanatory view of the channel portion of the liquid discharge head.

Figure 7:
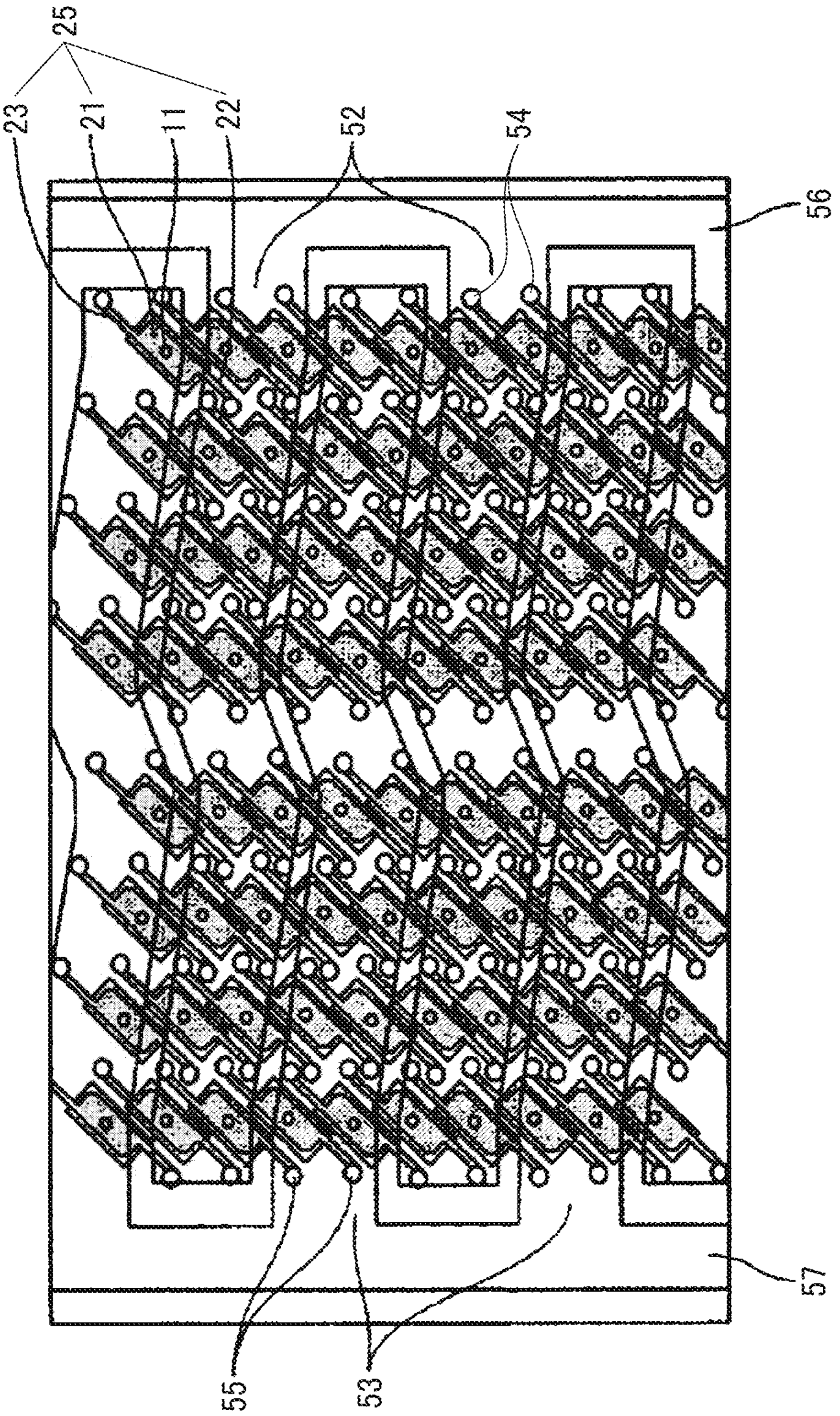
FIG. 7 is a plan explanatory view of the channel portion of the liquid discharge head.

FIG. 7 is a plan explanatory view of the channel portion of the liquid discharge head.

A liquid discharge head 1 according to the present embodiment includes a nozzle plate 10, a channel plate 20 as an individual channel member, a diaphragm member 30, a common channel member 50, a damper member 60, a frame member 80, and a flexible wiring substrate 101 on which a drive circuit 102 is implemented. The common channel member 50 is an example of a second substrate.

A nozzle substrate included in the nozzle plate 10, respective substrates included in the channel plate 20 and the diaphragm member 30, a subframe substrate included in the common channel member 50, and a damper substrate included in the damper member 60 are each made of a single-crystal Si wafer as substrate material. For such substrates, a plurality of chips (liquid discharge head) is manufactured simultaneously on a Si wafer by micromachining technology for microelectromechanical systems (MEMS) or semiconductor devices, and each substrate after chipping is joined together, resulting in the liquid discharge head 1.

As illustrated in FIGS. 4 and 5, the nozzle plate 10 is provided with a plurality of nozzles 11 for discharging liquid (droplets). The plurality of nozzles 11 is arranged in a two-dimensional matrix.

As illustrated in FIGS. 5 and 6, the channel plate 20 includes a plurality of pressure chambers 21 as a plurality of individual chambers in communication one-to-one with the plurality of nozzles 11, a plurality of individual supply channels 22 in communication one-to-one with the plurality of pressure chambers 21, and a plurality of individual collection channels 23 in communication one-to-one with the plurality of pressure chambers 21. As illustrated in FIG. 7, one pressure chamber 21 and the individual supply channel 22 and the individual collection channel 23 in communication with the one pressure chamber 21 are collectively referred to as an individual channel 25.

The diaphragm member 30 corresponds to an actuator substrate and forms a diaphragm 31 as a deformable wall face for each pressure chamber 21, in which the diaphragm 31 is provided integrally with a piezoelectric element 40. The diaphragm member 30 has a supply-side opening 32 in communication with an individual supply channel 22 and a collection-side opening 33 in communication with an individual collection channel 23. The piezoelectric element 40 corresponds to an electromechanical transducer and serves as a pressure generator that deforms the diaphragm 31 to apply pressure to the liquid in the pressure chamber 21.

Note that the channel plate 20 and the diaphragm member 30 are not limited to being mutually different members. For example, with a silicon on insulator (SOI) substrate as a common member, the channel plate 20 and the diaphragm member 30 can be integrally formed together. That is, based on a SOI substrate in which a silicon oxide film, a silicon layer, and a silicon oxide film are formed in this order on a silicon substrate, the channel plate can be achieved with the silicon substrate and the diaphragm 31 can be achieved with the silicon oxide film, the silicon layer, and the silicon oxide film. In such a configuration, the layer structure of the silicon oxide film, the silicon layer, and the silicon oxide film in the SOI substrate corresponds to the diaphragm member 30. As above, the diaphragm member 30 may be made of the materials of films on the surface of the channel plate 20.

The common channel member 50 corresponds to a liquid channel substrate and has a plurality of common supply branch channels 52 each in communication with two or more individual supply channels 22 and a plurality of common collection branch channels 53 each in communication with two or more individual collection channels 23, alternately and adjacently in a second direction S of the nozzles 11. The common channel member 50 has a through hole as a supply port 54 in communication with the supply-side opening 32 of an individual supply channel 22 and the corresponding common supply branch channel 52 and a through hole as a collection port 55 in communication with the collection-side opening 33 of an individual collection channel 23 and the corresponding common collection branch channel 53.

The common channel member 50 has at least one common supply main channel 56 in communication with the plurality of common supply branch channels 52 and at least one common collection main channel 57 in communication with the plurality of common collection branch channels 53.

The damper member 60 includes a supply-side damper 62 facing (opposite) the supply port 54 of a common supply branch channel 52 and a collection-side damper 63 facing (opposite) the collection port 55 of a common collection branch channel 53.

The common supply branch channels 52 and the common collection branch channels 53 result from occlusion of grooves arrayed alternately in the common channel member 50 as a common member by a damper plate 66 as a damper that is a sheet member. Then, the supply-side damper 62 is achieved with the damper plate 66 corresponding to each common supply branch channel 52, and the collection-side damper 63 is achieved with the damper plate 66 corresponding to each common collection branch channel 53.

Note that the damper plate 66 is preferably a metallic thin film or inorganic thin film resistant to organic solvents and is preferably not more than 10 μm in thickness. Preferably, the damper plate 66 has a laminated structure of a plurality of layers. In order to function as a damper, preferably, the damper plate 66 is not less than $7\times10^{-17}$ m/N in compliance, 3 to 200 GPa in Young's modulus, and 2 to 10 μm in thickness.

The damper member 60 in the liquid discharge head 1 according to the present embodiment inhibits pressure variations in a liquid channel (e.g., the individual supply channel 22) at the time of liquid discharge from a nozzle 11 from exerting influence (e.g., crosstalk) on liquid discharge from another nozzle 11. When the damper member 60 functions properly as a damper, an occurrence of crosstalk, in which vibrations (pressure variations) at the time of liquid discharge travel through liquid to exert influence on liquid discharge of an adjacent nozzle, can be reduced, so that the accuracy of liquid discharge from each nozzle 11 can be stabilized.

Figure 8:
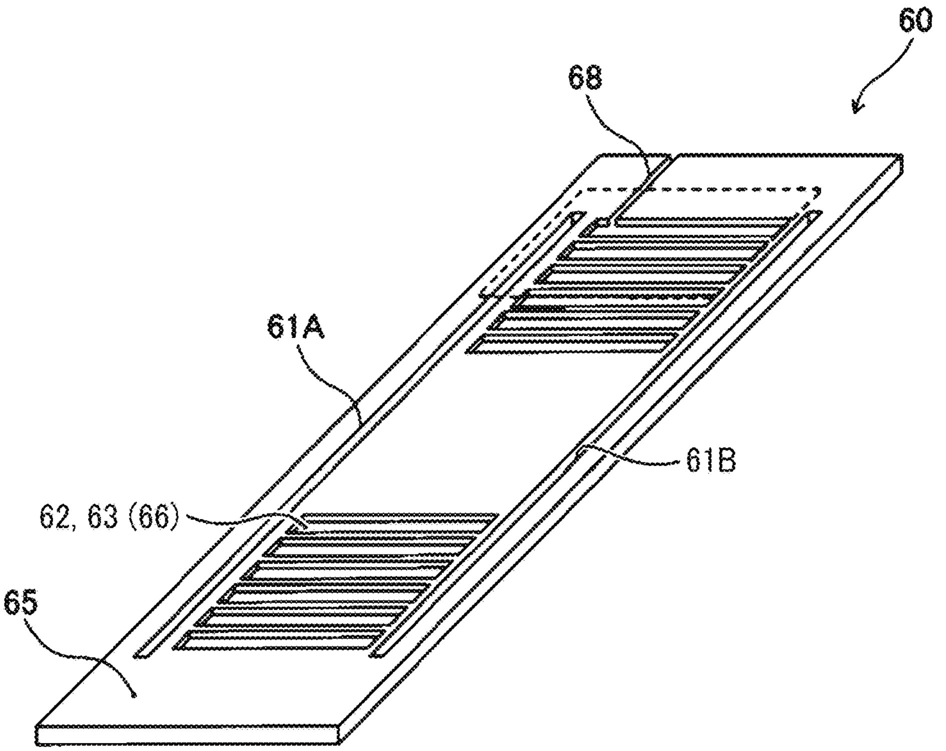
FIG. 8 is a perspective view of a damper member in the embodiment.

FIG. 8 is a perspective view of the damper member 60 in the present embodiment.

As illustrated in FIG. 8, the damper member 60 includes, mainly, a damper frame substrate 65 as a damper holding substrate rectangular and tabular in shape. The damper frame substrate 65 has through holes 61A and 61B, along the long sides of the damper frame substrate 65, in communication with the at least one common supply main channel 56 and the at least one common collection main channel 57 of the common channel member 50, respectively. The damper member 60 includes the supply-side damper 62 and the collection-side damper 63 in the region between the through holes 61A and 61B of the damper frame substrate 65. The damper frame substrate is an example of a first substrate or the damper holding substrate.

Next, trouble in a comparative liquid discharge head will be described.

Figure 9:
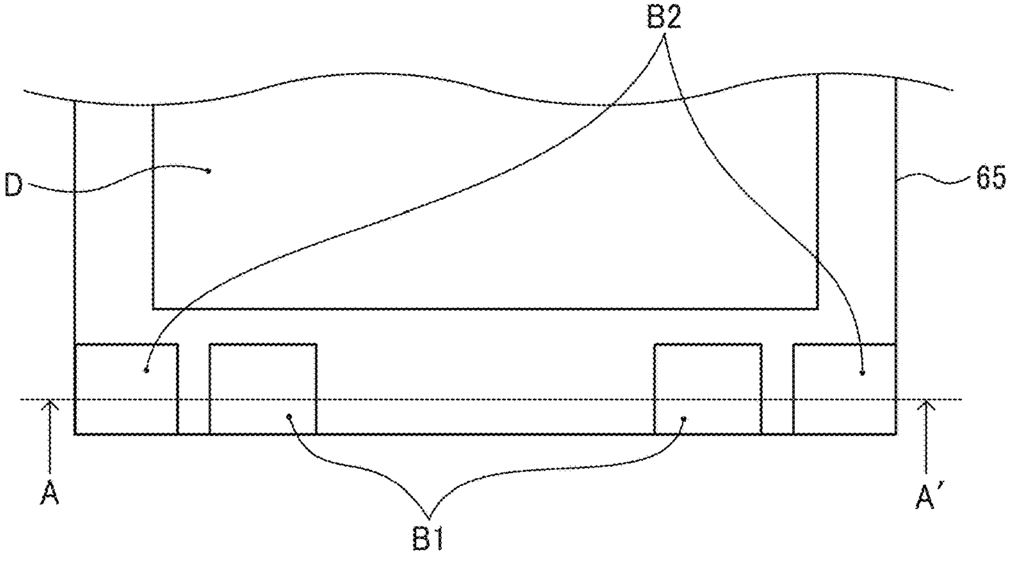
FIG. 9 is a plan view of regions for adhesive on a damper frame substrate.

FIG. 9 is a plan view of regions for adhesive on a damper frame substrate 65.

Figure 10:
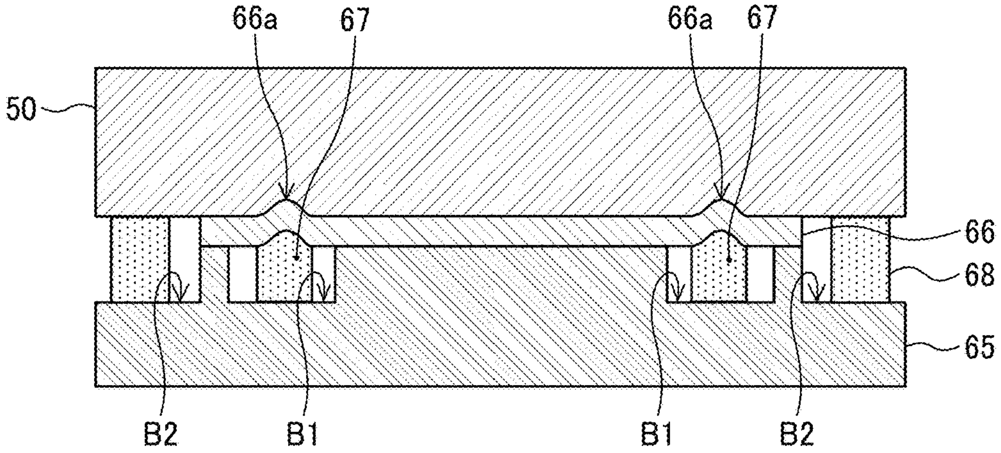
FIG. 10 is a cross-sectional view of a joint between a damper member and a common channel member in a conventional liquid discharge head, taken along line A-A' of FIG. 9.

FIG. 10 is a cross-sectional view of a joint between a damper member 60 and a common channel member 50 in the comparative liquid discharge head, taken along line A-A' of FIG. 9.

There are various factors contributing to a deterioration in the discharging performance of a liquid discharge head. As a result of the present inventors' research, it has been found that a joining agent for use in joining a damper frame substrate 65 and a damper plate 66 can be another factor contributing to a deterioration in the discharging performance of a liquid discharge head.

More particularly, in order to join a damper frame substrate 65 as a first substrate and a common channel member 50 as a second substrate, in advance, a damper plate 66 to be interposed between the damper frame substrate 65 and the common channel member 50 is joined to the damper frame substrate 65. In the joining, first, an ultraviolet (UV) adhesive 67 that is a photo-curable resin as the joining agent is applied onto a first adhesive application region B1 as a joint region on the damper frame substrate 65, and then the damper plate 66 is joined to the damper frame substrate 65. In this case, the UV adhesive 67 on the first adhesive application region B1 is irradiated with ultraviolet rays, so that the UV adhesive 67 cures and the damper frame substrate 65 and the damper plate 66 are jointed together. In the joining, the UV adhesive 67 deforms and cures. Then, the deformed and cured the joining agent deforms the damper plate 66 locally and convexly as illustrated in FIG. 10.

A UV adhesive 68 that is a photo-curable resin as a second joining agent is applied onto a second adhesive application region B2 on the damper frame substrate 65, and then the damper member 60 after the joining is joined to the common channel member 50. Specifically, the damper plate 66 joined to the damper frame substrate 65 has a cutaway portion or through hole opposite the second adhesive application region B2 on the damper frame substrate 65, and thus the UV adhesive 68 in the second adhesive application region B2 makes the damper frame substrate 65 and the common channel member 50 directly joined together.

In this case, if the damper plate 66 to be interposed between the common channel member 50 and the damper frame substrate 65 is deformed locally and convexly as described above, a locally external force is added to the common channel member 50 due to a convex portion 66*a* of the damper plate 66. As a result, the common channel member 50 deforms to cause deformation of a piezoelectric element 40 or deformation of the structure around the piezoelectric element 40, leading to trouble to exert influence on discharging performance.

The damper plate 66 of the damper member 60 is thin and soft enough to deform in accordance with the deformation of the UV adhesive 67 having deformed and cured. Note that it is thought that the damper plate 66 does not deform locally and convexly even in contact with the UV adhesive 67 before curing but deforms locally and convexly as the UV adhesive 67 deforms (contracts) in curing. Note that the common channel member 50 is joined to the damper frame substrate 65 of the damper member 60 through the UV adhesive 68 in the second adhesive application region B2. In the joining, it is thought that the UV adhesive 68 deforms (contracts) in curing. However, because the common channel member 50 has a sufficient rigidity, no locally external force enough to exert influence on discharging performance is added to the common channel member 50.

Figure 11:
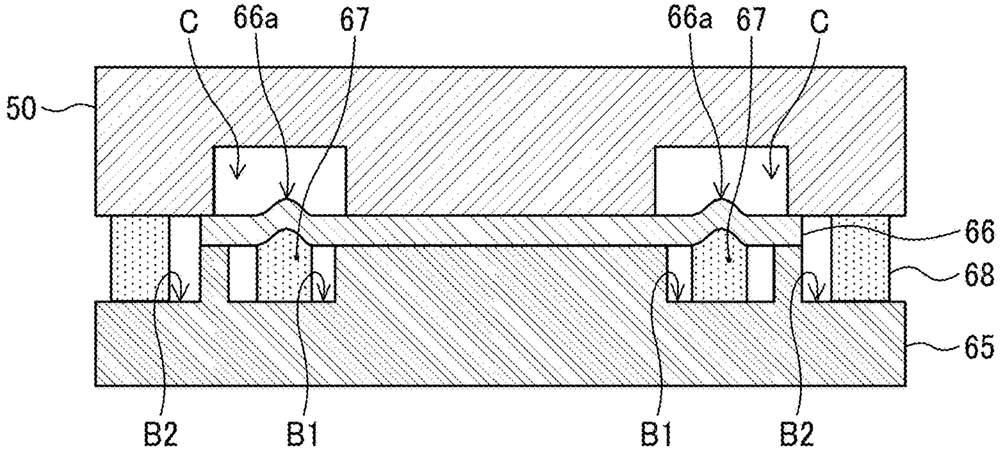

FIG. 11 is a cross-sectional view of a joint between the damper member 60 and the common channel member 50 in the liquid discharge head 1 according to the present embodiment, taken along line A-A' of FIG. 9.

As illustrated in FIG. 11, the common channel member 50 according to the present embodiment is provided with a gap C opposite the first adhesive application region B1 of the damper frame substrate 65 with the damper plate 66 interposed between the gap C and the first adhesive application region B. Thus, even when a convex portion 66*a* is generated in the damper plate 66 due to a UV adhesive 67, the convex portion 66*a* falls into the gap C of the common channel member 50 as illustrated in FIG. 11. As a result, a locally external force to the common channel member 50 based on the convex portion 66*a* generated due to the UV adhesive 67 can be suppressed smaller, so that a deterioration in discharging performance based on deformation of the common channel member 50 due to the convex portion 66*a* can be reduced.

The gap C in the present embodiment is provided out of any piezoelectric element 40 in the in-plane direction of the substrates (orthogonal to the thickness direction of the substrates). Specifically, the first adhesive application region B1 of the damper frame substrate 65 is provided out of a piezoelectric element/channel arrangement region D (refer to FIG. 9) in which piezoelectric elements 40 and channels are arranged, as illustrated in FIG. 9. Thus, the gap C opposite the first adhesive application region B1 is provided out of the piezoelectric element/channel arrangement region D.

The piezoelectric element/channel arrangement region D is also referred to as a "drive region D".

Thus, even in a case where such a gap C as in the present embodiment is provided, no influence is exerted on the arrangement of piezoelectric elements 40 and channels.

If the first adhesive application region B1 of the damper frame substrate 65 is disposed sufficiently away from structures, such as piezoelectric elements 40 and channels, that contribute to discharging performance (e.g., the piezoelectric-element/channel arrangement region D), even when a locally external force is added to the common channel member 50 due to the convex portion 66*a*, a deterioration in discharging performance is reduced. However, in this case, the liquid discharge head 1 is large in size. Therefore, the present embodiment enables, without an increase in the size of the liquid discharge head 1, inhibition of a deterioration in discharging performance due to the convex portion 66*a* generated due to the UV adhesive 67.

In the present embodiment, as illustrated in FIG. 11, the gap C of the common channel member 50 is identical in size to or larger in size than the first adhesive application region B1 as a region to which the UV adhesive 67 can be applied such that the gap C is located opposite the entirety of the first adhesive application region B1. Thus, the entirety of the convex portion 66*a* generated due to the UV adhesive 67 can fall into the gap C, so that a locally external force to the common channel member 50 due to the convex portion 66*a* can be suppressed to the minimum. Therefore, a deterioration in discharging performance due to the convex portion 66*a* generated due to the UV adhesive 67 can be more reliably reduced.

Figure 12:
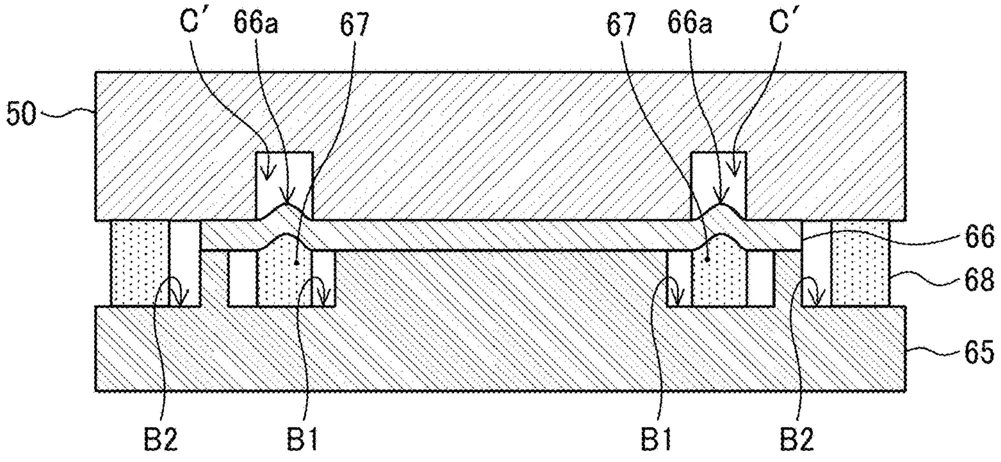
FIG. 12 is a cross-sectional view of a modification of a gap with which the common channel member is provided.

According to the present embodiment, provided may be a configuration in which a gap C' of the common channel member 50 is provided opposite part of the first adhesive application region B1, as illustrated in FIG. 12. A locally external force to the common channel member 50 due to the convex portion 66*a* can be suppressed smaller with the configuration illustrated in FIG. 12 than with a comparative configuration in which no gap C' is provided, so that a deterioration in discharging performance can be reduced.

In the present embodiment, the gap C with which the common channel member 50 is provided is identical in depth to the common supply branch channels 52 and the common collection branch channels 53 as liquid channels of the common channel member 50. Thus, the gap C can be formed in the same process as the common supply branch channels 52 and the common collection branch channels 53 are formed, leading to a simplified manufacturing process.

In the present embodiment, the UV adhesive 67 that is a photo-curable resin is adopted as the joining agent to be applied to the first adhesive application region B1. Thus, for joining, with the damper frame substrate 65 and the damper plate 66 stacked one on another, the UV adhesive 67 applied on the first adhesive application region B1 of the damper frame substrate 65 is irradiated with light (ultraviolet rays) from outside. For such irradiation, as illustrated in FIG. 9, the first adhesive application region B1 according to the present embodiment is located in an end region of the damper frame substrate 65. More particularly, the first adhesive application region B1 is located adjacently to a short side of the damper frame substrate 65 that is oblong.

In the present embodiment, in plan view, the first adhesive application region B1 and the gap C corresponding to the first adhesive application region B1 are each rectangular or quadrilateral in shape but may be each any in shape, such as circular in shape or polygonal in shape. Note that, for irradiation of the UV adhesive 67 on the first adhesive application region B1 with sufficient external light, preferably, the shape of the first adhesive application region B1 in plan view widens to an end portion (short side) of the damper frame substrate 65.

From a viewpoint of a simple manufacturing process, preferably, the first adhesive application region B1 has a shape in plan view such that the UV adhesive 67 can be coated in a circle.

Next, a liquid discharge unit including such a plurality of liquid discharge heads 1 as described above will be described.

Figure 13:
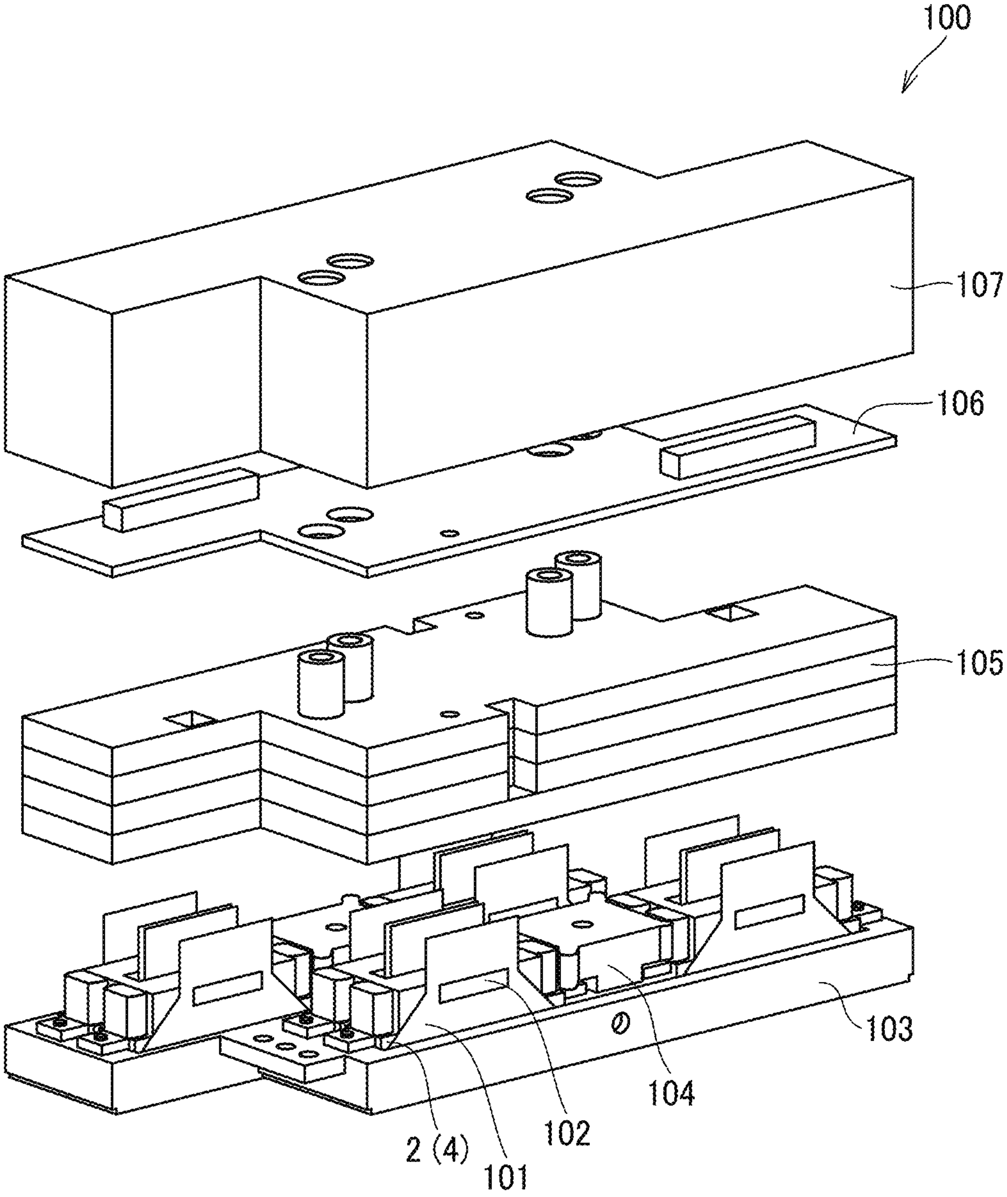
FIG. 13 is an exploded perspective explanatory view of a head module in the embodiment.
Figure 14:
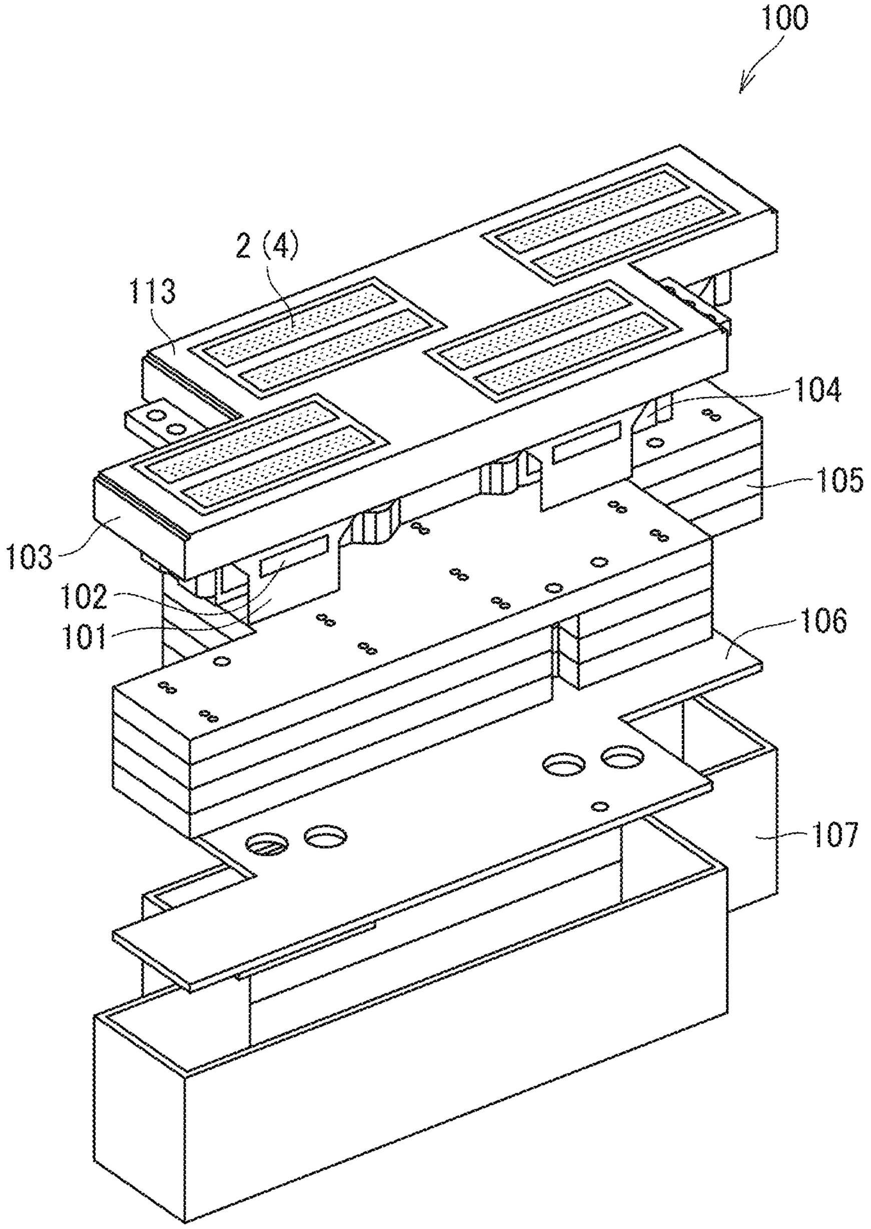
FIG. 14 is an exploded perspective explanatory view of the head module in the embodiment from the side of location of a nozzle face.

As illustrated in FIGS. 13 and 14, a liquid discharge unit 100 includes a plurality of liquid discharge heads 1, a base member 103 holding the plurality of liquid discharge heads 1, and a cover member 113 as a nozzle cover for the liquid discharge heads 1. The liquid discharge unit 100 further includes a heat dissipation member 104, a manifold 105 having liquid supply channels to the plurality of liquid discharge heads 1, a printed circuit board (PCB) 106 connected to the respective flexible wiring substrate 101 (flexible wiring boards) of the plurality of liquid discharge heads 1, and a module case 107.

Next, a liquid discharge apparatus including such a plurality of liquid discharge heads 1 as described above will be described.

Figure 15:
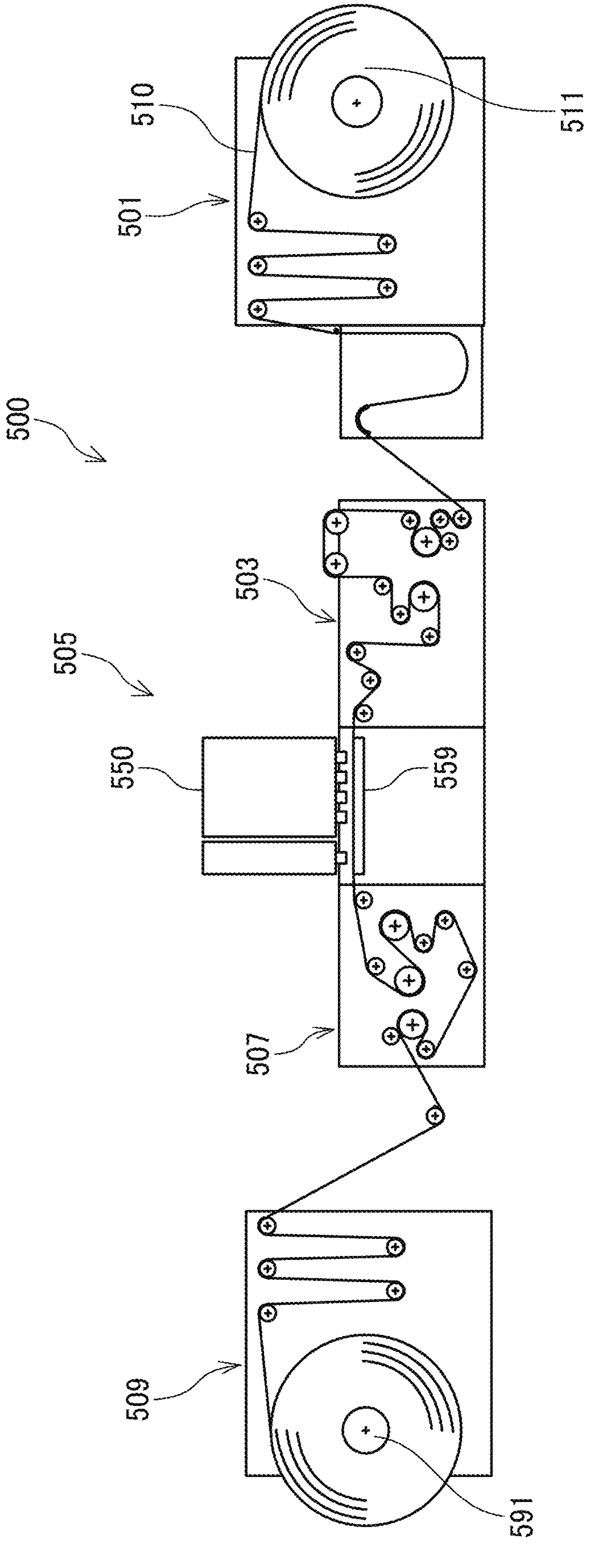
FIG. 15 is a schematic explanatory view of a printer in the embodiment.
Figure 16:
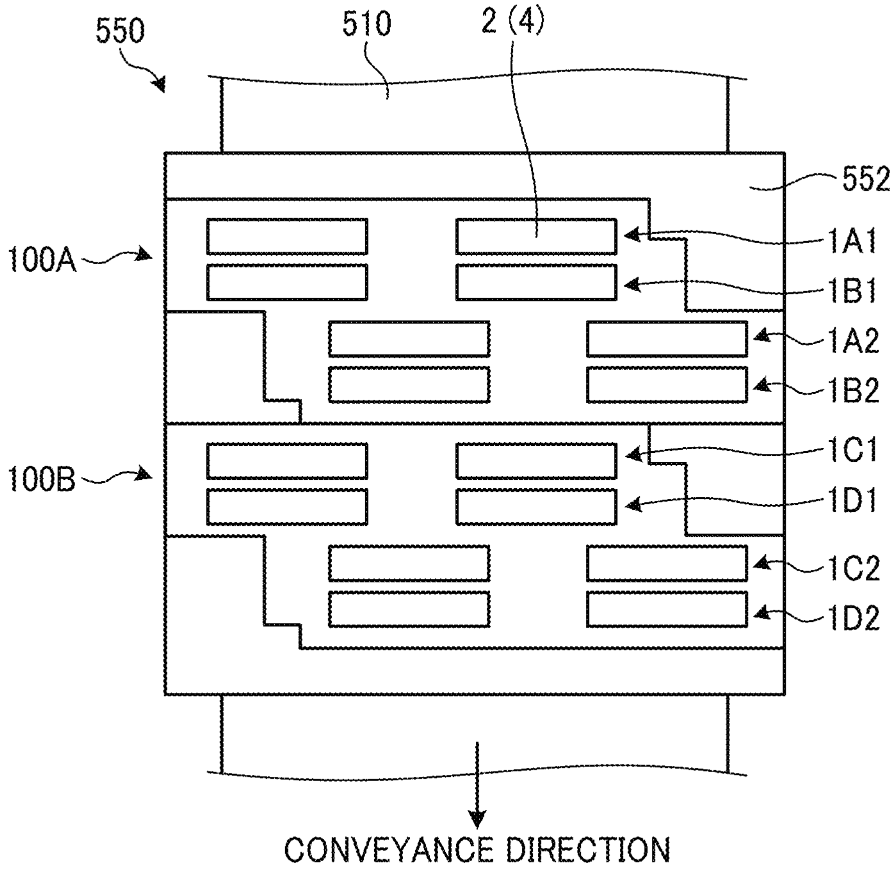
FIG. 16 is a plan explanatory view of an exemplary head unit in the printer.

As illustrated in FIGS. 15 and 16, a printer 500 as a liquid discharge apparatus includes a loader 501 that loads a continuous medium 510 as a recording medium and a guide conveyer 503 that guide-conveys the continuous medium 510 loaded by the loader 501 to a printing unit 505. The printer 500 further includes the printing unit 505 that performs printing such that an image is formed by discharge of liquid to the continuous medium 510, a dryer 507 that dries the continuous medium 510 to which liquid has adhered, and an unloader 509 that unloads the continuous medium 510.

The continuous medium 510 fed from a medium-wound roller 511 of the loader 501 is guide-conveyed by the rollers in the loader 501, the rollers in the guide conveyer 503, the rollers in the dryer 507, and the rollers in the unloader 509, and then is wound by a wind-up roller 591 of the unloader 509. In the printing unit 505, the continuous medium 510 is conveyed on a conveyance guide member 559 while facing a head unit 550 as a liquid discharge unit. The head unit 550 discharges liquid to print an image on the continuous medium 510.

The head unit 550 in the printer 500 includes such liquid discharge units 100A and 100B as described above. The liquid discharge units 100A and 100B are both provided on a common base member 552.

For the liquid discharge units 100A and 100B, the array direction of liquid discharge heads 1 orthogonal to the conveyance direction of the continuous medium is defined as a head array direction. Liquids identical in color are discharged with a set of head arrays 1A1 and 1A2 of the liquid discharge unit 100A. Similarly, liquid in a desired color is discharged with a set of head arrays 1B1 and 1B2 of the liquid discharge unit 100A. Liquid in a desired color is discharged with a set of head arrays 1C1 and 1C2 of the liquid discharge unit 100B. Liquid in a desired color is discharged with a set of head arrays 1D1 and 1D2 of the liquid discharge unit 100B.

Figure 17:
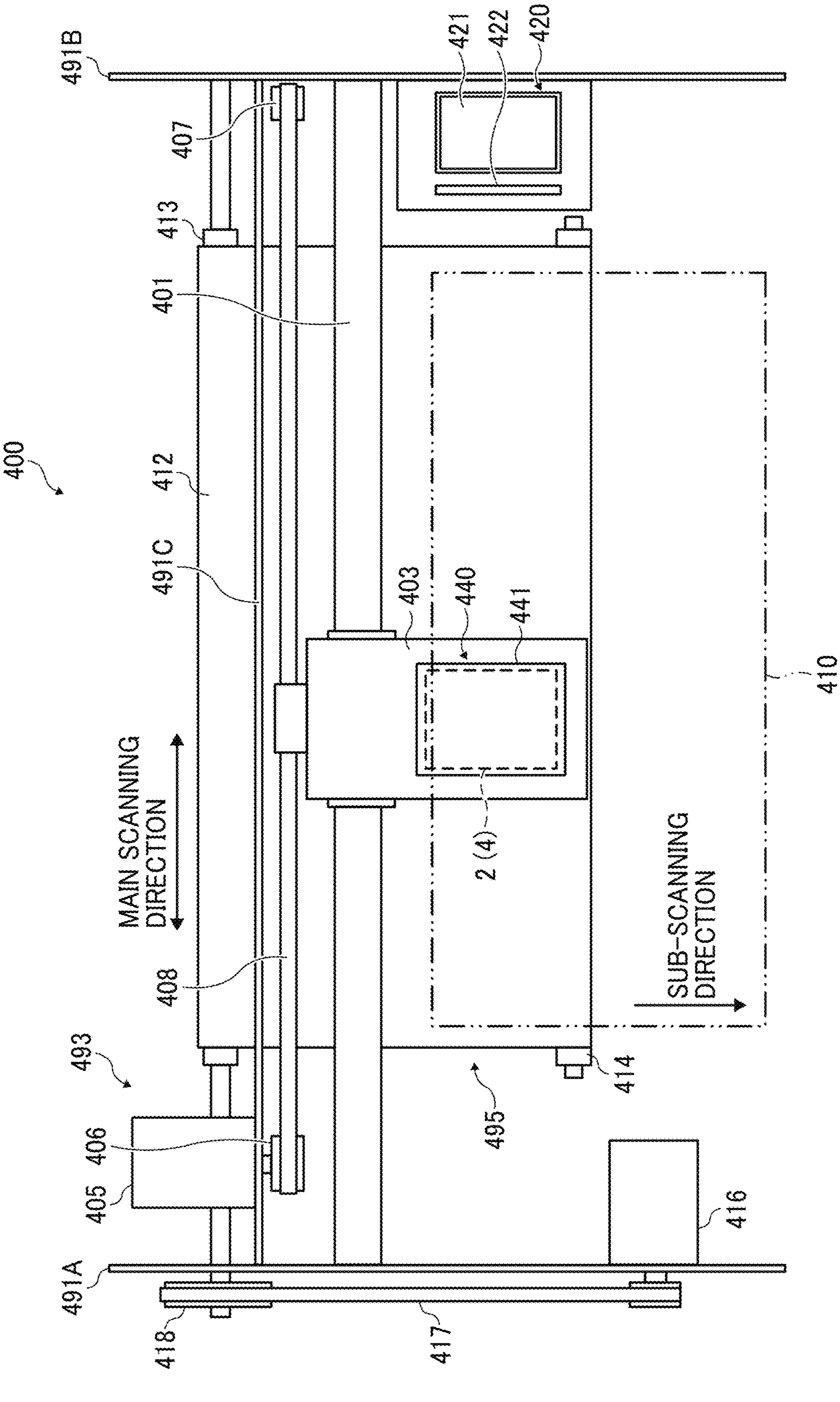
FIG. 17 is a plan explanatory view of main parts of an exemplary printer.
Figure 18:
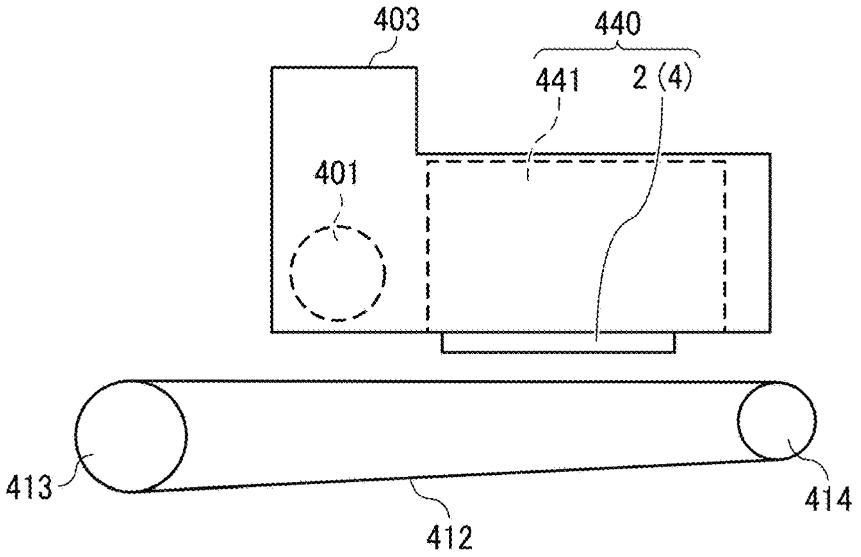
FIG. 18 is a side explanatory view of main parts of the exemplary printer.

Next, another exemplary printer as a liquid discharge apparatus will be described based on FIGS. 17 and 18.

A printer 400 as a liquid discharge apparatus corresponds to a serial head printer. A carriage 403 reciprocates in the main-scanning direction due to a main-scanning movement mechanism 493. The main-scanning movement mechanism 493 includes a guide member 401, a main-scanning motor 405, and a timing belt 408. The guide member 401 bridged between a left side plate 491A and a right-side plate 491B holds the carriage 403 movably. The carriage 403 reciprocates in the main-scanning direction due to transmission of the drive force of the main-scanning motor 405 through the timing belt 408 stretched around a drive pulley 406 and a driven pulley 407.

The carriage 403 is equipped with a liquid discharge unit 440 including a liquid discharge head 1 and a head tank 441 integrally together. For example, the liquid discharge head 1 discharges liquid in yellow (Y) color, cyan (C) color, magenta (M) color, or block (K) color. The liquid discharge head 1 has a nozzle array of a plurality of nozzles in the sub-scanning direction orthogonal to the main-scanning direction and is mounted with a downward liquid discharge direction. The liquid discharge head 1 is connected to a liquid circulator and thus is supplied with liquid in a desired color in circulation.

The printer 400 includes a conveyance mechanism 495 that conveys a sheet 410 as a recording medium. The conveyance mechanism 495 includes a conveyance belt 412 as a conveyer and a sub-scanning motor 416 that drives the conveyance belt 412. The conveyance belt 412, which is endless, is stretched around a conveyance roller 413 and a tension roller 414. The conveyance belt 412 conveys the sheet 410 in attraction opposite the liquid discharge head 1. Such attraction is, for example, electrostatic attraction or air suction. The conveyance belt 412 runs circumferentially in the sub-scanning direction due to transmission of the drive force of the sub-scanning motor 416 through a timing belt 417 and a timing pulley 418.

On one side in the main-scanning direction of the carriage 403, a maintenance mechanism 420 that maintains the liquid discharge head 1 is disposed laterally to the conveyance belt 412. The maintenance mechanism 420 includes, for example, a cap member 421 that caps the nozzle face of the liquid discharge head 1 and a wiper member 422 that wipes the nozzle face. The main-scanning movement mechanism 493, the maintenance mechanism 420, and the conveyance mechanism 495 are attached to a housing including the left side plate 491A, the right-side plate 491B and a back plate 491C.

In the printer 400 having the configuration described above, the sheet 410 attracted by the conveyance belt 412 is conveyed in the sub-scanning direction due to a circumferential run of the conveyance belt 412. In this case, with the carriage 403 moving in the main-scanning direction, the liquid discharge head 1 is driven, in response to an image signal, to discharge liquid to the sheet 410 remaining stopped, leading to formation of an image.

Figure 19:
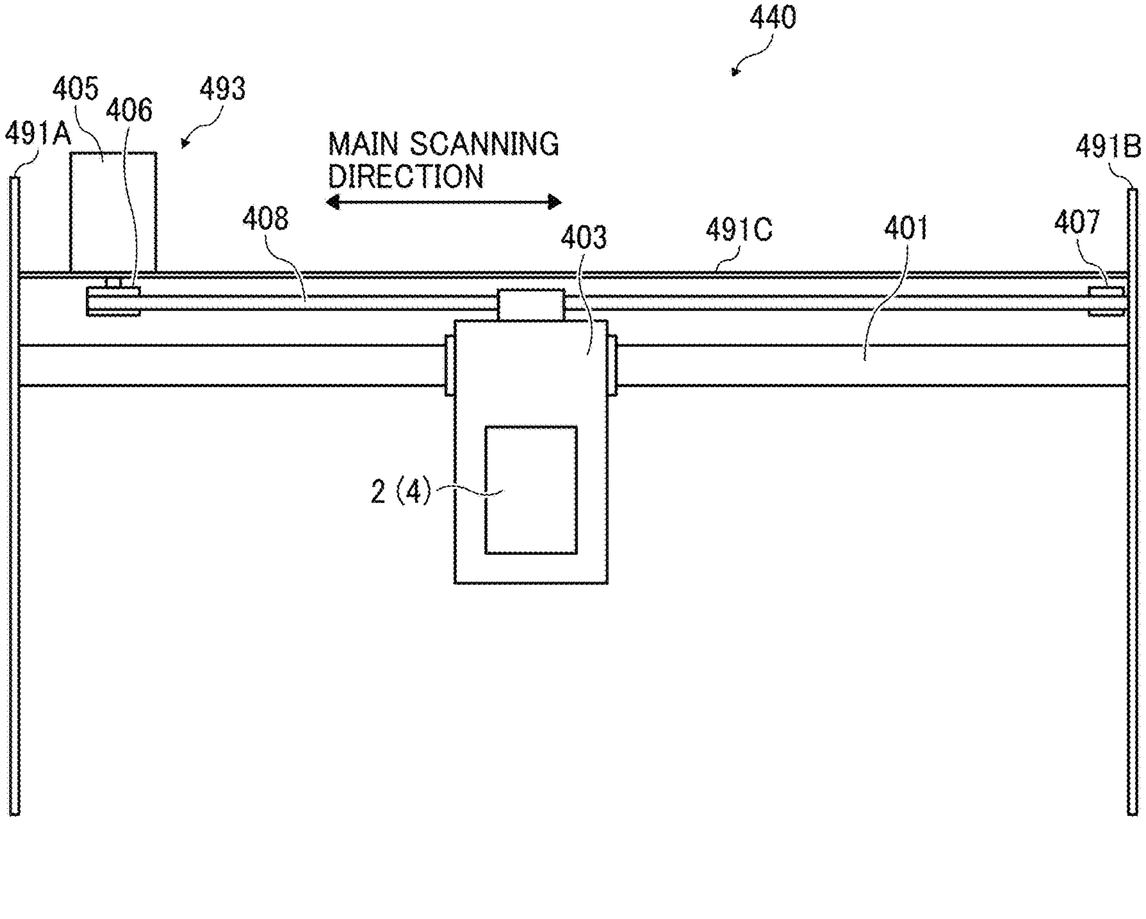
FIG. 19 is a plan explanatory view of main parts of an exemplary liquid discharge unit.

Next, the liquid discharge unit 440 described above will be described based on FIG. 19.

From among the constituent members of the printer 400 as a liquid discharge apparatus, the liquid discharge unit 440 includes the housing including the left side plate 491A, the right-side plate 491B, and the back plate 491C, the main-scanning movement mechanism 493, the carriage 403, and the liquid discharge head 1.

Note that the liquid discharge unit 440 may further include the maintenance mechanism 420, described above, attached to the right-side plate 491B.

Next, another exemplary liquid discharge unit will be described based on FIG. 20.

Figure 20:
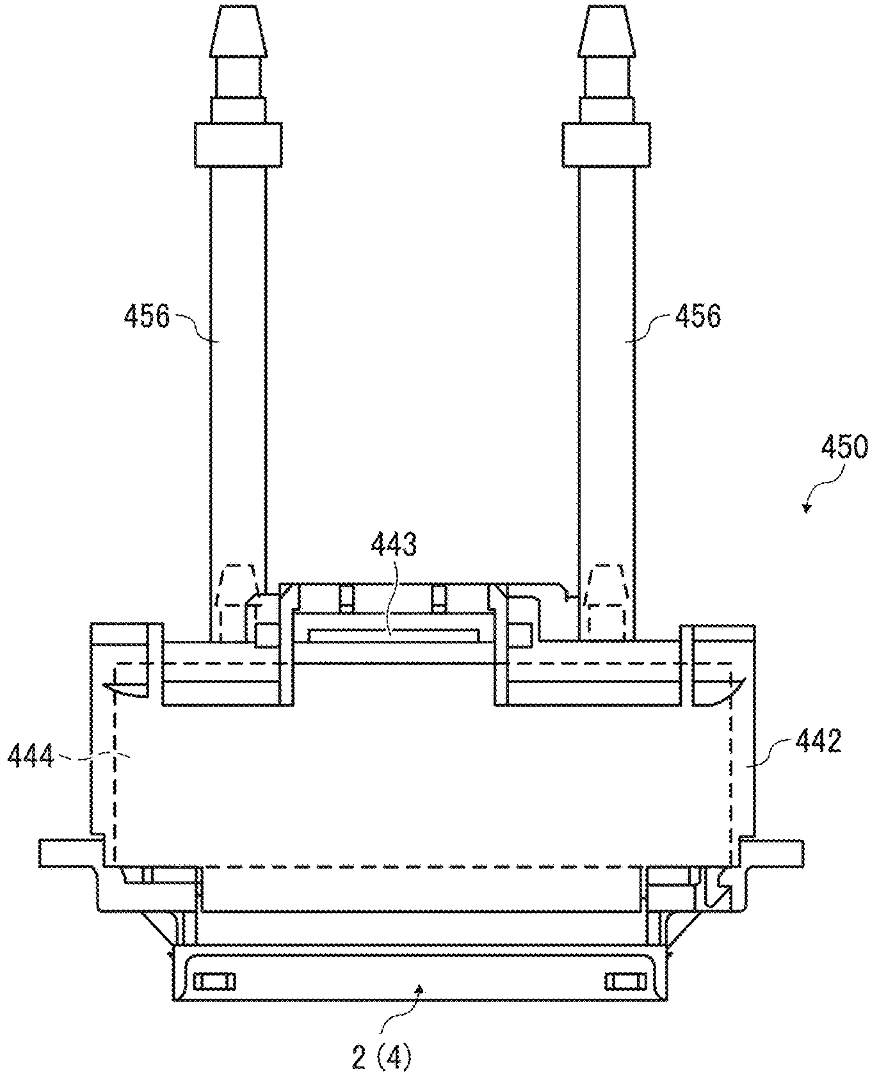
FIG. 20 is a front explanatory view of an exemplary liquid discharge unit.

A liquid discharge unit 450 illustrated in FIG. 20 includes a liquid discharge head 1 to which a channel component 444 is attached and a tube 456 connected to the channel component 444. The channel component 444 is disposed inside a cover 442 and has an upper portion provided with a connector 443 for electrical connection with the liquid discharge head 1. Note that the channel component 444 can be replaced with a head tank 441.

The liquid discharge units 100, 100A, 100B, 440, and 450, and the printers 400 and 500 as liquid discharge apparatuses, each including such a liquid discharge head 1 as described above, enable a functional effect similar to the functional effect of the liquid discharge head 1 described above.

In the present embodiment, liquid to be used may have any viscosity or surface tension, provided that the liquid can be discharged from a head. Such liquid to be used is preferably, but is not particularly limited to, not more than 30 mPa·s in viscosity at normal temperature and normal pressure or due to heating or cooling. More specific examples of liquid to be used include a solution, a suspension, and an emulsion that contain a solvent, such as water or an organic solvent, a colorant, such as dye or pigment, a functional material, such as a polymerizable compound, resin, or a surfactant, a biocompatible material, such as deoxyribonucleic acid (DNA), an amino acid, protein, or calcium, or an edible material, such as a natural pigment. Such a solution, a suspension, and an emulsion can be used, for example, for inkjet inks, surface treatment liquids, and material liquids for three-dimensional fabrication.

Examples of a source that generates energy to discharge liquid include a piezoelectric actuator (laminated piezoelectric element or thin-film piezoelectric element), a thermal actuator including an electrothermal transducer, such as a heating resistive element, and an electrostatic actuator including a diaphragm and opposed electrodes.

The “liquid discharge unit” corresponds to a liquid discharge head and a functional component or mechanism integrated together and is, for example, an aggregate of components relating to liquid discharge. The “liquid discharge unit” is, for example, a liquid discharge head and at least one of a head tank, a carriage, a supply mechanism, a maintenance mechanism, a main-scanning movement mechanism, or a liquid circulator, combined in configuration.

Examples of such integration include mutual fixation of a liquid discharge head and a functional component or mechanism by fastening, bonding, or engaging, and retention of a liquid discharge head and a functional component or mechanism, in which one is movable with respect to the other. A liquid discharge head and a functional component or mechanism may be mutually detachable.

An exemplary liquid discharge unit includes a liquid discharge head and a head tank integrated together. Another exemplary liquid discharge unit includes a liquid discharge head and a head tank integrated in mutual connection through a tube. In such a liquid discharge unit as above, a unit including a filter can be added between the liquid discharge head and the head tank.

Another exemplary liquid discharge unit includes a liquid discharge head and a carriage integrated together. Another exemplary liquid discharge unit includes a liquid discharge head, a carriage, and a main-scanning movement mechanism integrated together. Another exemplary liquid discharge unit includes a liquid discharge head and a main-scanning movement mechanism integrated together, in which the liquid discharge head is held movably by a guide member that is part of the main-scanning movement mechanism.

Another exemplary liquid discharge unit includes a liquid discharge head, a carriage, and a maintenance mechanism integrated together, in which a cap member that is part of the maintenance mechanism is secured to the carriage to which the liquid discharge head is attached. Another exemplary liquid discharge head includes a liquid discharge head and a supply mechanism integrated together, in which a tube is connected to the liquid discharge head to which a head tank or channel component is attached. The liquid discharge head is supplied with liquid from a liquid supply source through the tube.

An exemplary main-scanning movement mechanism is a guide member itself. An exemplary supply mechanism is a tube itself or a charger itself.

In the present embodiment, although each liquid discharge unit has been described above in combination with a liquid discharge head, examples of liquid discharge units include a liquid discharge unit including a head module including such a liquid discharge head as described above and such a functional component or mechanism as described above integrated together and a liquid discharge unit including a head unit including such a liquid discharge head as described above and such a functional component or mechanism as described above integrated together.

An exemplary liquid discharge apparatus includes a liquid discharge head, a liquid discharge unit, a head module, or a head unit, in which the liquid discharge head is driven to discharge liquid. Examples of liquid discharge apparatuses include an apparatus that discharges liquid to a material to which liquid can adhere and an apparatus that discharges liquid to gas or liquid.

An exemplary liquid discharge apparatus can include a feeder, a conveyer, an ejector, a pre-treatment device, and a post-treatment device for a material to which liquid can adhere. Examples of liquid discharge apparatuses include an image forming apparatus that discharges ink to a recording medium to form an image on the recording medium and a three-dimensional fabrication apparatus that discharges fabrication liquid to a powder layer in which powder material is layered, in order to fabricate a three-dimensional fabrication object.

A liquid discharge apparatus is not limited to an apparatus that discharges liquid to visualize a meaningful image, such as a character or a figure. Examples of liquid discharge apparatuses include an apparatus that forms a meaningless pattern and an apparatus that fabricates a meaningless three-dimensional image.

Such a material to which liquid can adhere as described above corresponds to a material to which liquid can adhere at least temporarily, such as a material to which liquid fastens after adhering to or a material into which liquid permeates after adhering to. Specific examples of the material to which liquid can adhere include recording media, such as a sheet, a film, and cloth, electronic components, such as an electronic substrate and a piezoelectric element, and media, such as a powder layer, an organ model, and a testing cell. Unless otherwise particularly limited, any materials to which liquid adheres are included. The material to which liquid can adhere may be any material to which liquid can adhere even temporarily, such as paper, thread, fiber, fabric, leather, metal, plastic, glass, wood, or ceramic.

An exemplary liquid discharge apparatus has a configuration in which a liquid discharge head and a material to which liquid can adhere move relatively, in which an object to move may be the liquid discharge head, the material to which liquid can adhere, or both of the liquid discharge head and the material to which liquid can adhere. Specific examples of such a liquid discharge apparatus include a serial head apparatus that moves a liquid discharge head and a line head apparatus that does not move a liquid discharge head.

Examples of liquid discharge apparatuses include a treatment-liquid coating apparatus that discharges, for the purpose of reforming the surface of a sheet, treatment liquid to the surface of a sheet to coat the treatment liquid on the surface of the sheet, and a jet granulation apparatus that jets a composition liquid including row material dispersed in a solution, through a nozzle to granulate fine particles of the row material.

Preferred embodiments of the present embodiment have been described above. However, the present embodiment is not limited to the particular embodiments. Unless otherwise particularly limited in the above description, various modifications and alterations can be made without departing from the scope of the gist of the present embodiment in the claims. The effects in the embodiments of the present embodiment are exemplified as most preferable effects derived from the present embodiment. Thus, effects according to the present embodiment are not limited to the effects in the embodiments of the present embodiment.

The above description is exemplary, and the following aspects each have a unique effect.

[First Aspect]

According to a first aspect, a liquid discharge head 1 including a plurality of substrates (e.g., a nozzle plate 10, a channel plate 20, a diaphragm member 30, a common channel member 50, and a damper frame substrate 65 of a damper member 60) stacked and joined in a thickness direction of the plurality of substrates, includes: a first substrate (e.g., the damper frame substrate 65) included in the plurality of substrates; a sheet member (e.g., a damper plate 66) joined to the first substrate with the joining agent (e.g., an UV adhesive 67) applied to a joint region (e.g., a first adhesive application region B1) on the first substrate; and a second substrate (e.g., the diaphragm member 30 or common channel member 50) joined to the first substrate with the sheet member interposed between the second substrate and the first substrate, the second substrate being included in the plurality of substrates, the second substrate being provided with a gap C or C' opposite the joint region of the first substrate with the sheet member interposed between the gap C or C' and the joint region.

There are various factors contributing to a deterioration in the discharging performance of a liquid discharge head. As a result of the present inventors' research, it has been found that the joining agent for use in joining can be another factor contributing to a deterioration in the discharging performance of a liquid discharge head. Particularly, in some cases, before a first substrate, such as a damper chamber formation member, and a second substrate, such as a common chamber member, are joined together, a sheet member, such as a damper member, is joined to the first substrate with the joining agent applied to a joint region on the first substrate. At the time of the joining, the joining agent between the first substrate and the sheet member deforms and cures. Then, the joining agent deforms the sheet member, which is thin, locally and convexly. As a result, due to the convex portion of the sheet member, a locally external force is added to the second substrate joined to the first substrate with the sheet member interposed between the second substrate and the first substrate. Then, the second substrate deforms, leading to trouble such as a deterioration in the discharging performance of a liquid discharge head.

According to the present aspect, the second substrate is provided with the gap opposite the joint region of the first substrate with the sheet member interposed between the gap and the joint region. Thus, even when the sheet member deforms convexly due to the joining agent, the convex portion of the sheet member falls in the gap of the second substrate, so that a locally external force can be suppressed to the second substrate. As a result, trouble due to deformation of the second substrate based on the convex portion of the sheet member due to the joining agent can be reduced.

Figure 21:
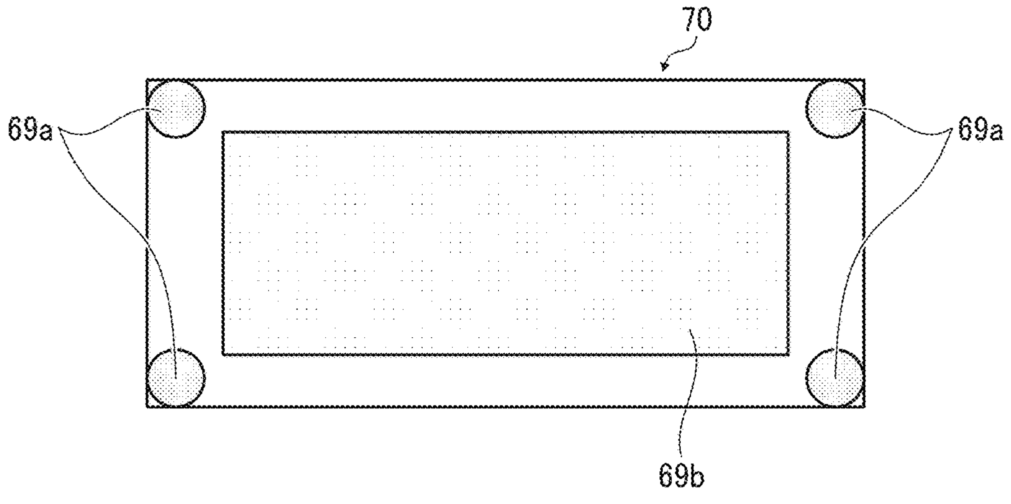
FIG. 21 is an explanatory view of exemplary two types of adhesives used in joining.

Note that, in order to join substrates together or join a substrate and a sheet member together, two or more types of the joining agent (adhesive) may be used. For example, a UV adhesive may be used for temporary joining and a heat-curable epoxy adhesive may be used for final joining. In this case, for example, as exemplified in FIG. 21, most of a face of a substrate 70 as a joining target is coated with a heat-curable epoxy adhesive 69*b*. In addition, the four corners of the face are coated with a UV adhesive 69*a*. After that, a substrate or sheet member as another joining target is stacked on the substrate 70. Then, the substrate 70 and the substrate or sheet member stacked one on another are irradiated with UV rays such that the UV adhesive 69*a* at the four corners cures, so that the substrate 70 and the substrate or sheet member are joined together. Such joining may be "temporary joining". After that, the two joining targets are heated under pressure such that the epoxy adhesive 69*b* cures thermally, so that the two joining targets are completely joined together. Such joining may be "final joining". In such thermal curing due to heating under pressure, misalignment is likely to occur between the two joining targets. However, temporary joining as temporary securing due to the UV adhesive cured before thermal curing enables avoidance of misalignment.

[Second Aspect]

According to a second aspect, in the first aspect, the second substrate includes an actuator substrate (e.g., the diaphragm member 30) holding an electromechanical transducer (e.g., a piezoelectric element 40) that operates such that liquid in a pressure chamber 21 is discharged through a nozzle 11.

In the present aspect, when a locally external force is added to the second substrate based on a convex portion of the sheet member due to the joining agent, the actuator substrate included in the second substrate deforms, leading to deformation of the electromechanical transducer or deformation of the structure around the electromechanical transducer. Thus, a deterioration tends to occur in the discharging performance of the liquid discharge head. According to the present aspect, a deterioration in discharging performance can be reduced in the liquid discharge head in which a deterioration in the discharging performance of the liquid discharge head tends to occur based on the convex portion of the sheet member due to the joining agent.

[Third Aspect]

According to a third aspect, in the second aspect, the gap is located out of the electromechanical transducer in an in-plane direction of the plurality of substrates.

Thus, the gap, with which the second substrate including the actuator substrate is provided, has no influence on the disposed electromechanical transducer.

[Fourth Aspect]

According to a fourth aspect, in the second or third aspect, the sheet member includes a damper (e.g., the damper plate 66), and the first substrate includes a damper holding substrate (e.g., the damper frame substrate 65).

Thus, even when the damper has a convex portion due to the joining agent through which the damper is joined to the damper holding substrate, deformation of the second substrate due to the convex portion is reduced, so that such occurrence of trouble as described above can be reduced.

[Fifth Aspect]

According to a fifth aspect, in any of the first to fourth aspects, the gap is located opposite entirety of the joint region.

Thus, the entirety of a convex portion generated on the sheet member due to the joining agent can fall into the gap, so that a locally external force to the second substrate due to the convex portion can be suppressed to the minimum. Thus, trouble due to the convex portion can be more reliably reduced.

[Sixth Aspect]

According to a sixth aspect, in any of the first to fifth aspects, the joining agent includes a photo-curable resin.

The photo-curable resin deforms convexly while contracting in curing, so that the sheet member is likely to have a convex portion. According to the present aspect, trouble due to a convex portion generated on the sheet member due to the photo-curable resin can be reduced.

[Seventh Aspect]

According to a seventh aspect, in the sixth aspect, the joint region is located in an end region of the first substrate.

Thus, for joining, the photo-curable resin applied to the joint region can be irradiated with light from outside through an end side of the first substrate.

[Eighth Aspect]

According to an eighth aspect, in any of the first to seventh aspects, the second substrate includes a liquid channel substrate (e.g., the common channel member 50) adjacent to the sheet member, and the liquid channel substrate is provided with the gap having a depth identical to a depth of a liquid channel (e.g., a common supply branch channel 52 and a common collection branch channel 53) that the liquid channel substrate has.

Thus, the gap can be formed to the second substrate in the same process as the liquid channel is formed in the second substrate, leading to a simplified manufacturing process.

[Ninth Aspect]

According to a ninth aspect, in any of the first to eighth aspects, the first substrate and the second substrate are joined together with a second joining agent through a cutaway portion or a through hole that the sheet member has.

Thus, the first substrate and the second substrate can be joined together with the second joining agent without the sheet member.

[Tenth Aspect]

According to a tenth aspect, a liquid discharge unit includes the liquid discharge head according to any of the first to ninth aspects.

Thus, the liquid discharge unit that can reduce trouble in the liquid discharge head due to the joining agent can be provided.

[Eleventh Aspect]

According to an eleventh aspect, a liquid discharge apparatus includes the liquid discharge head according to any of the first to ninth aspects.

[Aspect 1]

A liquid discharge head includes: a first substrate (65) having a joint region (B1); a sheet member (66) having a first face joined to the first substrate (65) with a joining agent applied to the joint region (B1) of the first substrate (65); and a second substrate (50) joined to a second face opposite to the first face of the sheet member and the first substrate (65), the sheet member (66) interposed between the first substrate (65) and the second substrate (50), wherein the second substrate (50) has a gap (C) facing the second face of the sheet member opposite to a portion of the first face of the sheet member joined to the joint region of the first substrate across the sheet member.

[Aspect 2]

The liquid discharge head according to aspect 1, further includes: a diaphragm (31); an electromechanical transducer (40) to vibrate the diaphragm (31); and an actuator substrate (30) holding an electromechanical transducer (40), wherein the second substrate (50) includes the actuator substrate (30).

[Aspect 3]

In the liquid discharge head according to aspect 2, the electromechanical transducer (40) is in a drive region (D) of the actuator substrate (30), and the gap (C) is disposed outside the drive region (D) in a plane of the second substrate.

[Aspect 4]

In the liquid discharge head according to aspect 2, the sheet member (66) includes a damper (62, 63), and the first substrate (65) includes a damper holding substrate (65) holding the damper (62, 63).

[Aspect 5]

In the liquid discharge head according to aspect 1, the gap (C) covers an area of the second face larger than an area of the portion of the first face joined to the joint region.

[Aspect 6]

In the liquid discharge head according to aspect 1, the joining agent includes a photo-curable resin.

[Aspect 7]

In the liquid discharge head according to aspect 6, the joint region is in an end region of the first substrate in a longitudinal direction of the first substrate.

[Aspect 8]

In the liquid discharge head according to aspect 6, the second substrate (50) is directly joined to the first substrate (65) at an end region (B2) of the first substrate in a longitudinal direction and in a transverse direction orthogonal to the longitudinal direction of the first substrate, and the joint region (B1) is inside the end region in the transverse direction of the first substrate (65).

[Aspect 9]

In the liquid discharge head according to aspect 1, the second substrate (50) has a liquid channel adjacent to the sheet member (66), and the liquid channel has a depth identical to a depth of the gap.

[Aspect 10]

In the liquid discharge head according to aspect 1, the sheet member has a cutaway portion or a through hole, and the first substrate and the second substrate are joined together with a second joining agent through the cutaway portion or the through hole.

[Aspect 11]

A liquid discharge unit includes the liquid discharge head according to aspect 1.

[Aspect 12]

A liquid discharge apparatus includes the liquid discharge head according to aspect 1.

Thus, the liquid discharge apparatus that can reduce trouble in the liquid discharge head due to the joining agent can be provided.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:

a first substrate having a joint region;

a sheet member having a first face joined to the first substrate with a joining agent applied to the joint region of the first substrate; and a second substrate joined to a second face opposite to the first face of the sheet member and the first substrate, the sheet member interposed between the first substrate and the second substrate, wherein the second substrate has a gap facing the second face of the sheet member opposite to a portion of the first face of the sheet member joined to the joint region of the first substrate across the sheet member.

2. The liquid discharge head according to claim 1, further comprising:

a diaphragm;

an electromechanical transducer to vibrate the diaphragm; and an actuator substrate holding an electromechanical transducer, wherein the second substrate includes the actuator substrate.

3. The liquid discharge head according to claim 2, wherein the electromechanical transducer is in a drive region of the actuator substrate, and the gap is disposed outside the drive region in a plane of the second substrate.

4. The liquid discharge head according to claim 2, wherein the sheet member includes a damper, and the first substrate includes a damper holding substrate holding the damper.

5. The liquid discharge head according to claim 1, wherein the gap covers an area of the second face larger than an area of the portion of the first face joined to the joint region.

6. The liquid discharge head according to claim 1, wherein the joining agent includes a photo-curable resin.

7. The liquid discharge head according to claim 6, wherein the joint region is in an end region of the first substrate in a longitudinal direction of the first substrate.

8. The liquid discharge head according to claim 6, wherein the second substrate is directly joined to the first substrate at an end region of the first substrate in a longitudinal direction and in a transverse direction orthogonal to the longitudinal direction of the first substrate, and the joint region is inside the end region in the transverse direction of the first substrate.

9. The liquid discharge head according to claim 1, wherein the second substrate has a liquid channel adjacent to the sheet member, and the liquid channel has a depth identical to a depth of the gap.

10. The liquid discharge head according to claim 1, wherein the sheet member has a cutaway portion or a through hole, and the first substrate and the second substrate are joined together with a second joining agent through the cutaway portion or the through hole.

11. A liquid discharge unit comprising the liquid discharge head according to claim 1.

12. A liquid discharge apparatus comprising the liquid discharge head according to claim 1.

* * * * *